United States Patent [19]

Taniyama

[11] Patent Number: 5,363,956
[45] Date of Patent: Nov. 15, 1994

[54] CONTAINER FOR PLURALITY OF STACKABLE OBJECTS

[76] Inventor: Yoshihiko Taniyama, 9380 Old Southwick Pass, Alpharetta, Ga. 30202

[21] Appl. No.: 21,476

[22] Filed: Feb. 22, 1993

[51] Int. Cl.⁵ .................. B65D 85/30; B65D 85/57
[52] U.S. Cl. .................. 206/312; 206/309; 206/480; 206/483
[58] Field of Search ............ 206/307, 309, 312, 455, 206/480, 483, 472, 560; 312/9.53, 9.55

[56] References Cited

U.S. PATENT DOCUMENTS

| | | | |
|---|---|---|---|
| 2,811,251 | 10/1957 | Yerkovich | 206/455 |
| 4,535,888 | 8/1985 | Nusselder | 206/444 |
| 4,613,044 | 9/1986 | Saito et al. | 206/444 |
| 4,655,345 | 4/1987 | Drake et al. | 206/309 |
| 4,702,369 | 10/1987 | Philosophe | 206/312 |
| 4,817,792 | 4/1989 | Seifert | 206/309 |
| 4,833,819 | 5/1989 | Sherman | 206/560 |
| 4,850,477 | 7/1989 | Gelardi et al. | 206/45.19 |
| 4,875,743 | 10/1989 | Gelardi et al. | 312/13 |
| 4,928,818 | 5/1990 | Friess et al. | 206/309 |
| 4,932,522 | 6/1990 | Milovich | 206/309 |
| 4,998,618 | 3/1991 | Borgions | 206/307 |
| 5,016,752 | 5/1991 | Haugen Jr. | 206/455 |
| 5,050,734 | 9/1991 | Chen | 206/444 |
| 5,101,971 | 4/1992 | Grobecker | 206/332 |
| 5,168,991 | 12/1992 | Whitehead et al. | 206/312 |
| 5,267,647 | 12/1993 | Stumpff et al. | 206/310 |
| 5,310,054 | 5/1994 | Stumpff et al. | 206/309 |

*Primary Examiner*—David T. Fidei
*Attorney, Agent, or Firm*—Troutman Sanders

[57] ABSTRACT

A storage container for stackable objects, such as mini-disk cartridges. The container includes a base tray for stacking the objects, and flexible protrusions for securing the objects. The objects are secured in the base tray by positioning at least two protrusions such that the top portions of the protrusions make contact with the edges of the uppermost stacked object to create a pressure or snap fit.

16 Claims, 3 Drawing Sheets

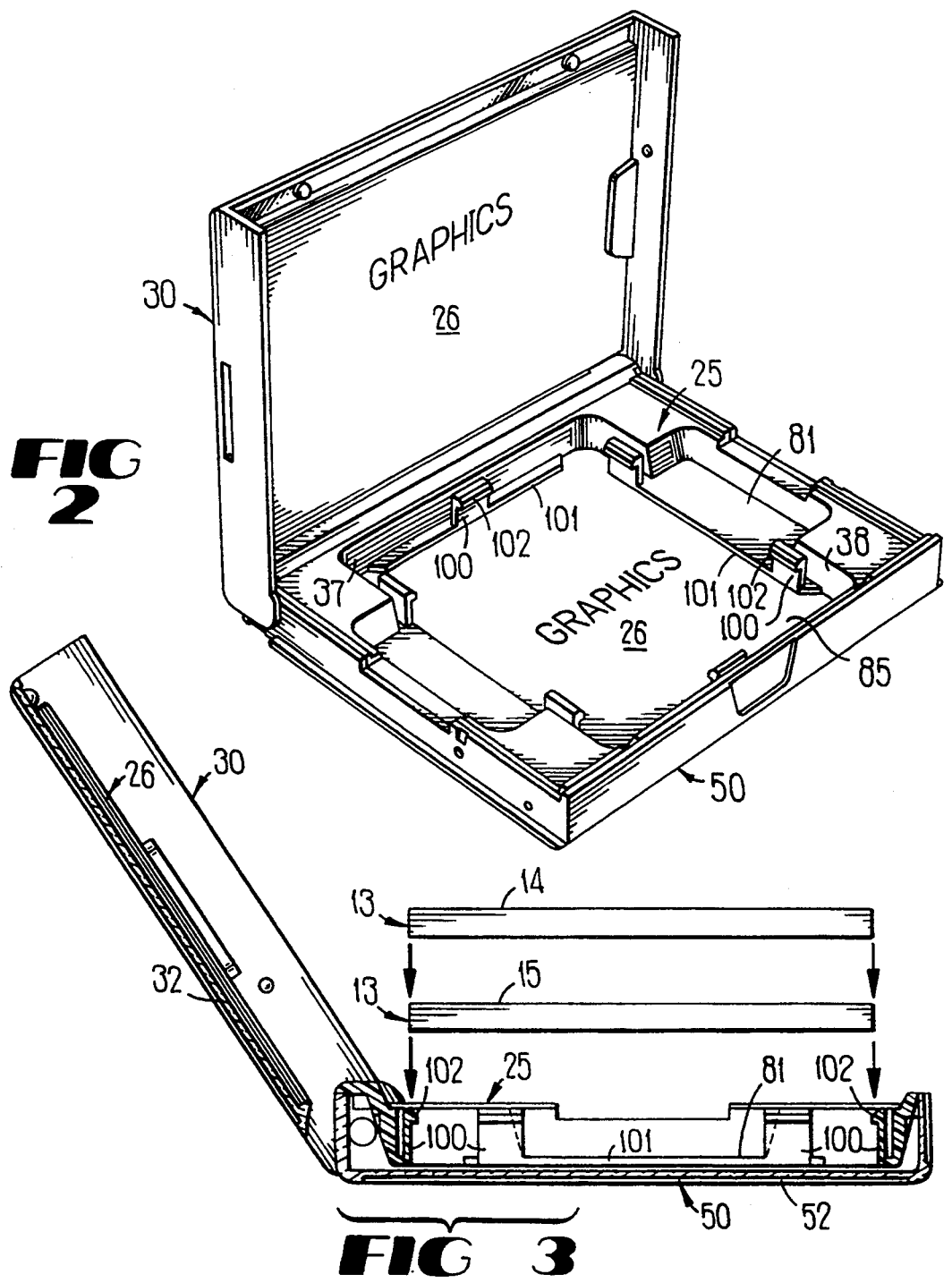

CONTAINER FOR PLURALITY OF STACKABLE OBJECTS

BACKGROUND OF INTENTION

1. Field of Invention

This invention relates to a storage container for storing multiple objects. More specifically, this invention relates to a storage container having a base tray in which multiple objects, such as mini-compact disk ("mini-CD") cartridges and standard compact disks, may be stacked and secured in the base tray. The objects are secured in the base tray with flexible protrusions which are positioned to make contact with the edges of the uppermost stacked object such that the uppermost object and all objects stacked below it are secured within the container.

2. Description of the Prior Art

Conventional storage containers for storing objects, such as mini CD cartridges and standard compact disks, are often formed of transparent plastic. These storage containers typically include a base tray and a cover, which are mated together to form a compartment for one object. The conventional base tray typically includes space for one object and possibly room for promotional material to be stored below the object such that the material shows through the transparent bottom surface of the base tray. The contentional cover usually includes space for promotional material to be inserted such that the material shows through the transparent top surface.

These conventional storage containers perform adequately for the storage of one object. However, with society's ever increasing emphasis on efficiency, these containers are extremely inefficient when it comes to the storage of two or more objects, because separate containers must be used. An example of an industry in which this problem exists is the recording industry which utilizes information storage media such as mini-CD cartridges and standard compact disks to distribute music to the public. In this industry, there is often a need to package two or more mini-CD cartridges or standard compact disks in the same container due to the vast number of songs sought to be packaged and the limited amount of storage space on each optical disc. Therefore, a need exists for a storage container utilizing a conventional base tray and a cover, which may be used to hold two or more objects. Further, a need exists for this container to provide an adequate securing mechanism to ensure that the objects within the container remain stationary upon transporting and/or handling of the container.

SUMMARY OF THE INVENTION

It has been previously established that a need exists for a storage container, utilizing a conventional base tray and cover, which may be adapted to house two or more stackable objects, such mini-CD cartridges or standard compact disks. Further, a need exists for this container to provide a means for ensuring that the objects will remain adequately secured within the container.

These and other objectives are achieved with the storage container of the present invention by increasing the height of the container such that additional objects may be stacked within the base tray. Moreover, the objects may be secured within the base tray with a protrusion configuration which includes two or more precisely positioned flexible protrusions with finger-like top portions. These protrusions may extend upwardly from the bottom surface of the base tray or a receiving tray inserted into the base tray, or may extend inwardly from the side walls of the base tray or receiving tray such that they create a pressure or snap fit with the side edges of the uppermost stacked object. By creating this pressure or snap fit, the uppermost stacked object resting on top of the other stacked objects is locked into place, and the contact and weight from the uppermost object in turn is utilized to keep the other stacked objects stationary within the container.

In a preferred embodiment, the container is designed for mini-CD cartridges. Since these cartridges are often packaged and sold in containers having the same height as a standard audio tape cassette to take advantage of already existing audio tape cassette retail racks, the height of this container is often already adequate to enclose two mini-CD cartridges. These containers typically utilize a receiving tray which is inserted into the base tray and has a center opening with four rims which surround a cartridge. In a preferred embodiment, the container is designed for two mini-CD cartridges. At least one protrusion is positioned in front of each of the four side rims of the center opening, such that it may extend upwardly from the bottom surface of the receiving tray. Each flexible protrusion has a finger-like top portion which is designed to make contact with the uppermost cartridge when the cartridges have been stacked in the container. The contact may come in the form of the finger-like top portion of the protrusions pressing against the side edges of the uppermost cartridge to create a pressure fit, or may be achieved by fashioning the finger-like top portion so that it pushes down against the top edges of the uppermost cartridge to produce a snap fit. By utilizing the finger-like top portions of these flexible protrusions, the uppermost cartridge is locked it to place on the top of the lowermost cartridge, which is also secured in place due to the contact and weight of the uppermost cartridge.

Though utilizing at least one protrusion on each edge of the four edges of the cartridges has been found to perform favorably as a securing mechanism, two protrusions positioned on opposed edges of the uppermost cartridge have been found to perform more than adequately. Also, though the protrusions perform properly when extending upwardly from the bottom surface of the receiving tray, they have been found to work just as well when extending inwardly from the side walls of the center opening of the receiving tray. If the receiving tray is not inserted into the base tray, the protrusions may extend upwardly from the bottom surface of the base tray or inwardly from the side walls of the base tray to provide similar results. As would be expected, the height of the container may be increased such that additional cartridges may be stacked within the base tray and receiving tray.

BRIEF DESCRIPTION OF THE DRAWINGS

The accompanying drawings illustrate several presently preferred but nevertheless illustrative embodiments of the invention, and serve to aid in the explanation of the principles of the invention.

FIG. 2 is an open perspective view of the container for mini-CD cartridges of FIG. 1 with graphics inserted into the base tray and a booklet inserted into the cover.

FIG. 3 is a cross-sectional side view of the container for mini-CD cartridges of FIG. 1 in the open position, with two mini-CD cartridges ready for insertion.

FIG. 4 is a cross-sectional view of the container for mini-CD cartridges of FIG. 1 in the closed position, with two mini-CD cartridges stacked in the container and secured by the protrusion configuration.

DETAILED DESCRIPTION OF ILLUSTRATIVE EMBODIMENT

Figure 1:
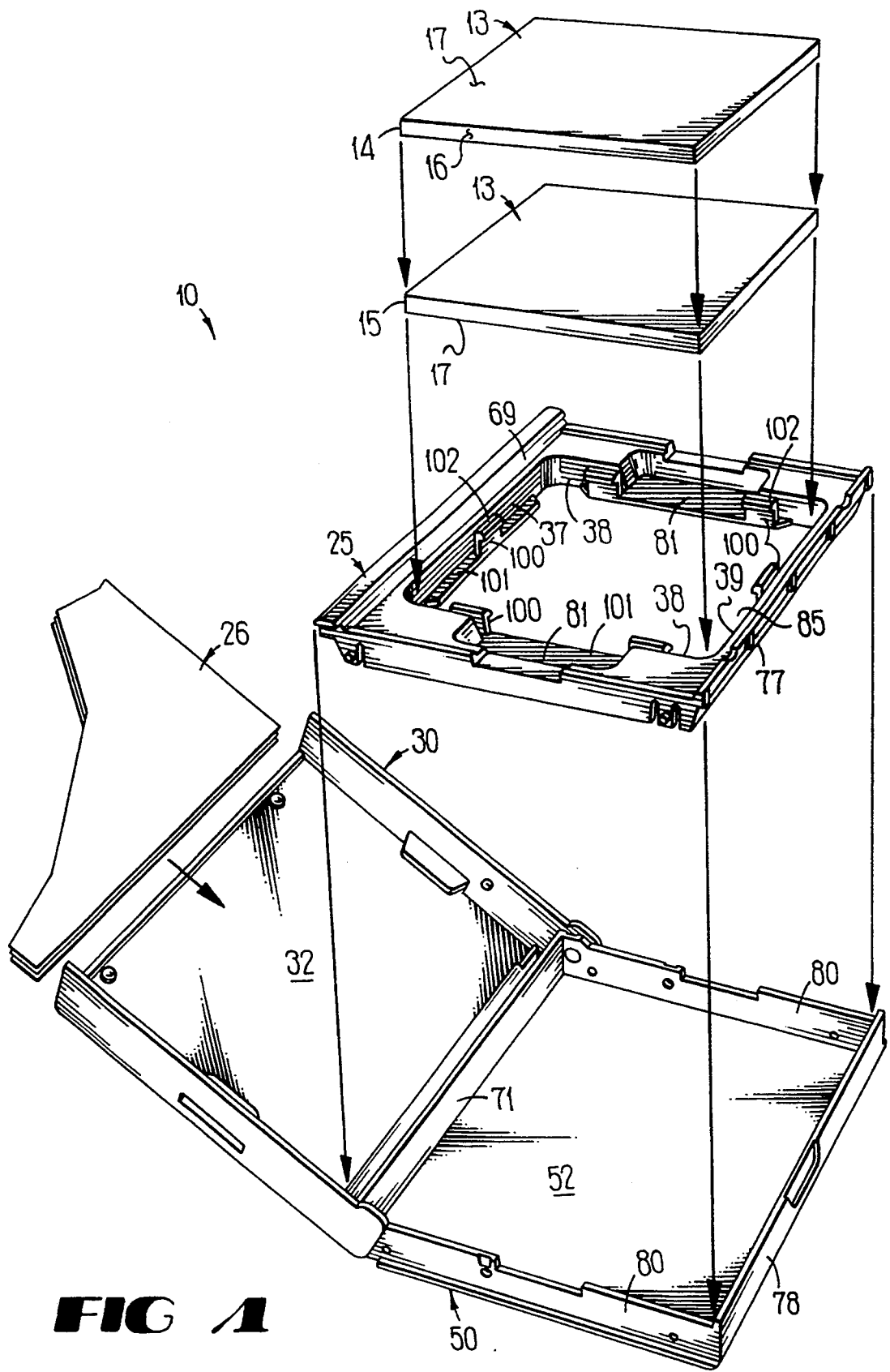
FIG. 1 is an exploded perspective view of the container for mini-CD cartridges in the open position, with the receiving tray and two mini-CD cartridges ready for insertion.

The container 10 of the present invention utilizing the protrusion configuration may be adapted to store many different types of stackable objects. As shown in FIGS. 1-5, in a preferred embodiment this invention is utilized to house and secure two or more mini-CD cartridges (an optical disc which is encased in a rectangular enclosure), also referred to as a mini-disk cartridges 13.

The container 10 is preferably formed of a transparent plastic material, such as polystyrene, and includes three components, a base tray 50, a receiving tray 25, and a cover 30. All three of these components may take the shape and may include features of any known storage container for mini-disk cartridges.

Figure 5:
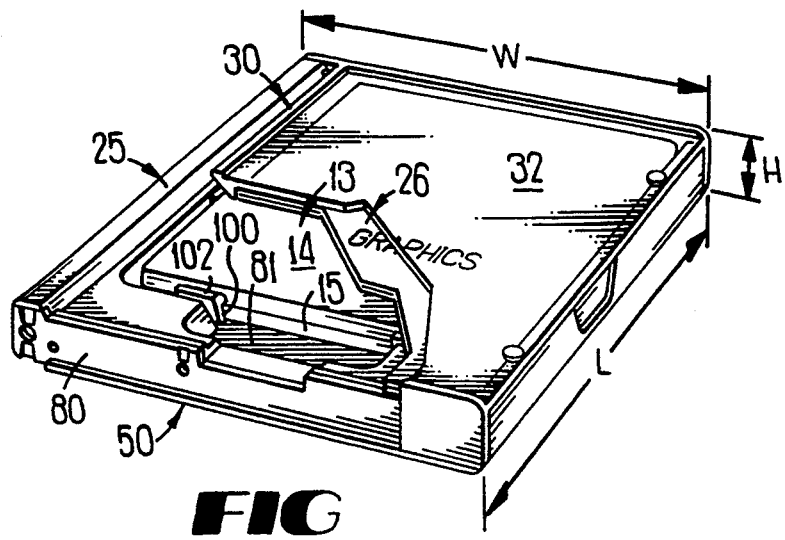
FIG. 5 is a top cut away perspective view of the container for mini-CD cartridges of FIG. 1 in the closed position, with two mini-CD cartridges stacked in the container and secured by the protrusion configuration.

As shown in FIG. 5, the width W and the length L may remain unchanged, with the height H typically needing to be increased. The minimum height H of the new container 10 will need to be slightly greater than the total height of the mini-disk cartridges when stacked on top of each other. However, the height H may be increased further to include space for promotional material 26 or the like to be inserted within the container 10. Today, the length L and height H of many mini-disk cartridge containers 10 are equal to that of standard audio tape cassette containers to take advantage of already existing retail racks for standard audio tape cassettes. Therefore, two mini-disk cartridges 10 may already be comfortably stacked in these containers 10 without increasing the height.

Referring to FIG. 1, the base tray 50 preferably includes a pair of side walls 80, a front wall 78, and a rear wall 71, which extend perpendicularly upward from a bottom surface 52. These walls 80, 78, and 71 are preferably the walls of the container 10 that have their height increased, through the walls of the cover 30 and receiving tray 25 may also be increased.

The receiving tray 25 which is inserted into the base tray 50 preferably includes a rear wall 69, a front wall 77, and a center opening 85. The dimensions of the center opening 85 is preferably slightly greater than the length and the width of a mini-disk cartridge 13 such that mini-disk cartridges may be stacked within the opening 85. The rimmed center opening 85 is made up of a rear rim 37, two side rims 38, and a front rim 39. At least one flexible protrusion 100 is preferably formed to a bottom surface or flanges 101 which extend inwardly from the bottom edges of the rims 37, 38, and 39.

One protrusion 100 extending upwardly from each flange 101 such that a protrusion 100 makes contact with each edge 16 of the uppermost mini-disk cartridge 14 has been found to work effectively. Additionally, as is illustrated in FIGS. 6-11, each of the protrusions 100 has top portion 102 with a tapered top surface 103 for facilitating lateral displacement of the protrusions 100 when an edge 16 of a stackable object vertically contacts surface 103. However, two or more protrusions 100 may be formed to each flange 101 for increased contact with the edges of the uppermost cartridge 14 to further ensure that the cartridges 13 remain secure. As shown here, this may be particularly applicable when the receiving tray 25 includes finger inserts 81 formed in one or both side rims 38, thereby creating a situation where protrusions 100 are best positioned on both sides of the finger inserts 81.

A protrusion configuration may include one protrusion 100 extending from as few as two flanges 101. This configuration performs adequately as long as the flanges 101 are located on opposed edges of the uppermost mini-disk cartridge 14 such that the protrusion configuration still creates a pressure or snap fit.

Graphics cards or promotional material 26 may be inserted into the base tray 50 such that the contents of the mini-disk cartridges 13 may be viewed through the transparent bottom surface 52 of the base tray. Also, when no mini-disk cartridges are inserted into the receiving tray 25, the contents of the cartridge may be viewed from above the base tray 50 by viewing a card or promotional material 26 from the center opening 85. This card or promotional material 26 may be inserted face-up within the center opening 85 or may be inserted on the bottom surface 52 before the receiving tray 25 is inserted into the base tray 50. Graphics and/or promotional materials 26 may also be inserted into most conventional covers that are utilized for the storage of mini-disk cartridges such that the contents of the mini-disk cartridges may also be viewed through the transparent top surface 32 of the cover 30. Though the contents of the mini-disk cartridges 13 may be viewed via graphics cards and/or promotional material, the mini-disk cartridges 13 may be inserted with the label side 17 of the lowermost cartridge 15 facing down and the label side 17 of the uppermost cartridge 14 facing up such that the cartridges 13 may provide a means for identifying the contents of the container 10 when no cards or promotional material 26 are employed. Also, though not shown, a receiving tray with a floor which extends from the flanges 101 may be used as a surface for the cartridges 13 to be seated. When utilizing the floor, a graphics card or promotional material 26 may be inserted face down on top of the bottom surface 52 of the base tray 50 before the receiving tray 25 is inserted into the base tray 50.

As shown in FIG. 3, in this embodiment the lowermost cartridge 15 is inserted into the center opening 85 first such that it rests on the bottom surface 52 of the base tray 50 and the uppermost cartridge 14 is inserted on top of the lowermost cartridge 15. As shown in FIG. 4, when the cartridges have been inserted, the uppermost cartridge 14 rests on top of the lowermost cartridge 15 to create a stacked combination of cartridges 13.

When the cartridges 13 have been stacked, the protrusion configuration may be utilized to keep the cartridges 13 stationary when the container 10 is handled. The securing of the cartridges 13 is accomplished by having the top portions 102 of the protrusions 100 make contact with an edge 16 of the uppermost cartridge 14 to create a pressure fit, as shown here, or a snap fit. By utilizing the contact between the protrusions 100 and the edges 16 of the uppermost cartridge, the uppermost cartridge 14 is kept in place as it rests on top of the lowermost cartridge 15 and the lowermost cartridge 15 is kept secure due to the contact and weight from the uppermost cartridge 14. As shown in FIG. 4, when stacked, the cartridges 13 should form a compact fit within the receiving tray 25 with the protrusions 100 providing an adequate means of securing the cartridges 13.

Figure 6:
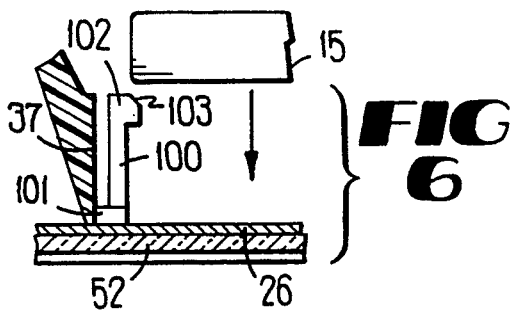
FIG. 6 is an isolated sectional view of the lowermost mini-CD cartridge ready for insertion within a container utilizing a pressure fit protrusion configuration extending upwardly from the bottom surface of the receiving tray and positioned in front of a side wall of the receiving tray.
Figure 7:
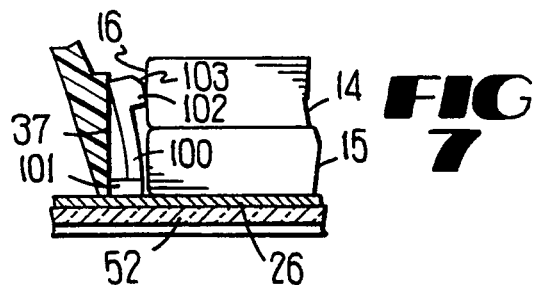
FIG. 7 is an isolated sectional view of two mini-CD cartridges stacked within a container utilizing a pressure fit protrusion configuration extending upwardly from the bottom surface of the receiving tray and positioned in front of a side wall of the receiving tray.
Figure 8:
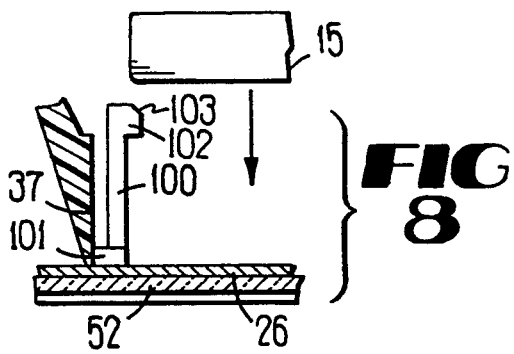
FIG. 8 is an isolated sectional view of the lowermost mini-CD cartridge ready for insertion within a container utilizing a snap fit protrusion configuration extending upwardly from the bottom surface of the receiving tray and positioned in front of a side wall of the receiving tray.
Figure 9:
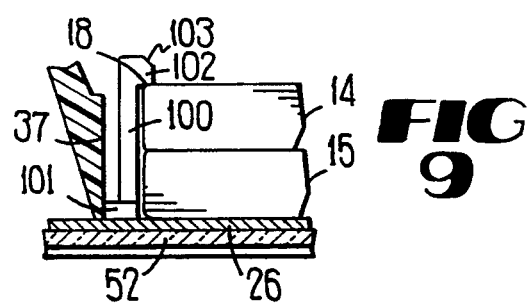
FIG. 9 is an isolated sectional view of two mini-CD cartridges stacked within a container utilizing a snap fit protrusion configuration extending upwardly from the bottom surface of the receiving tray and positioned in front of a side wall of the receiving tray.
Figure 10:
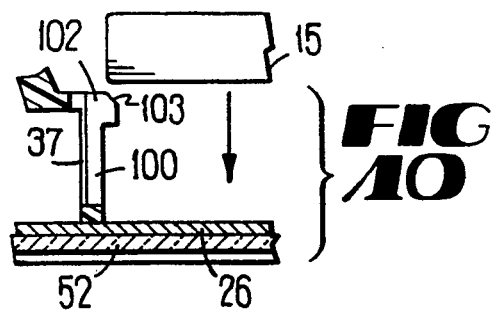
FIG. 10 is an isolated sectional view of the lowermost mini-CD cartridge ready for insertion within a container utilizing a pressure fit protrusion configuration extending upwardly from the lower portion of a side wall of the receiving tray and positioned flush with the receiving tray rims.
Figure 11:
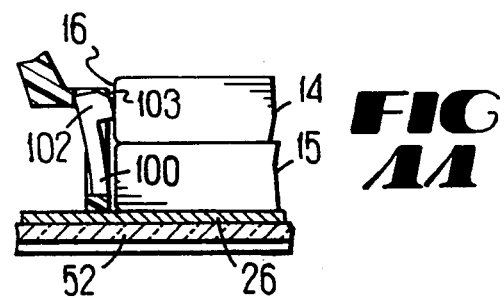
FIG. 11 is an isolated sectional view of two mini-CD cartridges stacked within a container utilizing a pressure fit protrusion configuration extending upwardly from the lower portion of a side wall of the receiving tray and positioned flush with the receiving tray rims.

FIGS. 6-9 are preferred but nevertheless illustrative embodiments of the flexible protrusions 100. Referring to FIGS. 6 and 7, the top portion 102 of each protrusions 100 extend inwardly such that they may make contact with the side edges 16 of the uppermost cartridge 14 to create a pressure fit. As shown in FIGS. 8 and 9, the height of the protrusions may be lengthened such that the top portions 102 of each protrusion 100 which extend inwardly may make contact with the top edges 18 of the uppermost cartridge 14 to produce a snap fit. Finally, as shown in FIGS. 10 and 11, the rims 37, 38, and 39 may have depressed or cut-out portions such that the protrusions 100 can be positioned flush with the rims 37, 38, and 39.

For all of these embodiments, the top portion 102 of each protrusion is preferably flush with the top surface of each rim 37, 38, and 39. However, the top portions 102 do not have to be flush with the top surface of each rim 37, 38, and 39, especially when the height of a rim 37, 28 or 39 is shorter than the height created by the stacked cartridges 13. In that instance, the top portion 102 would extend above the top surface of the rim 37, 38 or 39.

What has been described are preferred embodiments of the present invention. It is of course not possible to describe every conceivable combination of components for purposes of describing the present invention, but one of ordinary skill in the art will recognize that many further combinations and permutations of the present invention are possible. All such possible modifications are to be included within the scope of the invention, as defined by the following claims.

I claim:

1. A receiving apparatus for use in a container for stackable objects, said receiving apparatus comprising:
 a bottom surface; and
 a plurality of protrusions coupled to said bottom surface for securing the stackable objects, wherein each said protrusion is laterally resilient for accepting stackable objects which are vertically placed into said receiving apparatus and further includes;
 a vertical bottom portion having a first end and a second end, wherein said first end is integrally formed to said bottom surface, and
 a top portion for engaging an uppermost stackable object, wherein said top portion is formed on said second end and includes a thickness greater than a thickness of said bottom portion.

2. The receiving apparatus of claim 1, in combination with a receiving tray having a bottom surface, wherein said bottom surface of said receiving tray is matingly engageable with said bottom surface of said receiving apparatus, and wherein said plurality of protrusions extend upwardly from said bottom surface of said receiving tray.

3. The receiving apparatus of claim 2, wherein said plurality of protrusions are integrally formed to said bottom surface of said receiving tray.

4. The receiving apparatus of claim 1, further comprising a plurality of side walls coupled to said bottom surface wherein said plurality of side walls extend upwardly from said bottom surface, and wherein each said protrusion is positioned inwardly from said plurality of side walls.

5. The receiving apparatus of claim 4 wherein said plurality of side walls are integrally formed to said bottom surface.

6. The receiving apparatus of claim 4, in combination with a receiving tray having a bottom surface and a plurality of side walls extending upwardly from said bottom surface of said receiving tray, wherein said bottom surface of said receiving tray is matingly engageable with said bottom surface of said receiving apparatus, and wherein each said protrusion is positioned inwardly from said plurality of side walls of said receiving tray.

7. The receiving apparatus of claim 1, wherein said top portion of said protrusion configuration is positioned to make contact with at least one side portion of the uppermost stackable object.

8. The receiving apparatus of claim 1, wherein said top portion of said protrusion configuration is positioned to make contact with at least one top portion of the uppermost stackable object.

9. An enclosure for stackable objects, said enclosure comprising:
 a receiving apparatus adapted to receive the stackable objects, said receiving apparatus including:
 a bottom surface;
 a plurality of protrusions coupled to said bottom surface for securing the stackable objects, wherein each said protrusion is laterally resilient for accepting stackable objects which are vertically placed into said receiving apparatus and further includes, a vertical bottom portion having a first end and a second end, wherein said first end is integrally formed to said bottom surface, and a top portion for engaging an uppermost stackable object, wherein said top portion is formed on said second end further includes a thickness greater than a thickness of said bottom portion; and a cover for enclosing said receiving apparatus.

10. The enclosure of claim 9, in combination with a receiving tray having a bottom surface, wherein said bottom surface of said receiving tray is matingly engageable with said bottom surface of said receiving apparatus, and wherein said plurality of protrusions extend upwardly from said bottom surface of said receiving tray.

11. The enclosure of claim 10, wherein said plurality of protrusions are integrally formed to said bottom surface of said receiving tray.

12. The enclosure of claim 9, further comprising a plurality of side walls coupled to said bottom surface wherein said plurality of side walls extend upwardly from said bottom surface, and wherein each said protrusion is positioned inwardly from said plurality of side walls.

13. The enclosure of claim 12, wherein said plurality of side walls are integrally formed to said bottom surface.

14. The enclosure of claim 12, in combination with a receiving tray having a bottom surface and a plurality of side walls extending upwardly from said bottom surface of said receiving tray, wherein said bottom surface of said receiving tray is matingly engageable with said bottom surface of said receiving apparatus, and wherein each said protrusion is positioned inwardly from said plurality of side walls of said receiving tray.

15. The enclosure of claim 9, wherein said top portion is positioned to make contact with at least one side portion of the uppermost stackable object.

16. The enclosure of claim 9, wherein said top portion is positioned to make contact with at least one top portion of the uppermost stackable object.

* * * * *